United States Patent
Heckmann et al.

(10) Patent No.: US 9,686,827 B2
(45) Date of Patent: Jun. 20, 2017

(54) CIRCUIT ARRANGEMENT FOR OPERATING LIGHT SOURCES

(71) Applicant: OSRAM GmbH, Munich (DE)

(72) Inventors: Markus Heckmann, Munich (DE); Joachim Mühlschlegel, Groebenzell (DE); Thomas Pollischansky, Munich (DE); Harald Schmitt, Munich (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 15/111,190

(22) PCT Filed: Nov. 5, 2014

(86) PCT No.: PCT/EP2014/073783
§ 371 (c)(1),
(2) Date: Jul. 13, 2016

(87) PCT Pub. No.: WO2015/106850
PCT Pub. Date: Jul. 23, 2015

(65) Prior Publication Data
US 2016/0330807 A1    Nov. 10, 2016

(30) Foreign Application Priority Data

Jan. 17, 2014   (DE) ......................... 10 2014 200 865

(51) Int. Cl.
| | |
|---|---|
| *H05B 33/08* | (2006.01) |
| *H02M 1/42* | (2007.01) |
| *H02M 3/335* | (2006.01) |

(52) U.S. Cl.
CPC .......... *H05B 33/0815* (2013.01); *H02M 1/42* (2013.01); *H02M 3/33546* (2013.01);
(Continued)

(58) Field of Classification Search
CPC .... H05B 37/032; H05B 37/036; H05B 39/06; H05B 33/0815; H05B 33/0827;
(Continued)

(56) References Cited

U.S. PATENT DOCUMENTS

| | | | |
|---|---|---|---|
| 6,950,319 B2 * | 9/2005 | Huber ................. | H02M 1/4258 363/21.12 |
| 7,358,710 B2 * | 4/2008 | Luo ..................... | H02M 3/1588 323/272 |

(Continued)

FOREIGN PATENT DOCUMENTS

| | | |
|---|---|---|
| CN | 101841953 A | 9/2010 |
| CN | 103155703 A | 6/2013 |

(Continued)

OTHER PUBLICATIONS

International Search Report based on Application No. PCT/EP2014/073783 (3 Pages and 2 Pages of English translation) dated Feb. 12, 2015.

(Continued)

*Primary Examiner* — Vibol Tan
(74) *Attorney, Agent, or Firm* — Viering, Jentschura & Partner mbB (57) ABSTRACT

A circuit arrangement for operating light sources includes input terminals for a power supply system voltage, a first rectifying circuit, a boost converter having output terminals, a half-bridge arrangement having two switches, which is connected to the output terminals of the boost converter, an inductance, the first terminal of which is coupled to the centre point of the half-bridge, and a second rectifying circuit, the first input terminal of which is coupled to the second terminal of the inductance and the second input of which is coupled to one of the output terminals of the boost converter. The output terminals of the second rectifying circuit are coupled to the inputs of a current-compensated (Continued)

inductor. At least one light source is connected to the output terminals of the current-compensated inductor, and the output terminals of the current-compensated inductor are coupled to an output terminal of the boost converter via filter capacitors.

4 Claims, 7 Drawing Sheets

(52) U.S. Cl.
CPC ..... *H05B 33/0827* (2013.01); *H05B 33/0842* (2013.01); *Y02B 20/348* (2013.01)
(58) Field of Classification Search
CPC .... H05B 33/0842; H02M 3/156; H02M 1/42; H02M 3/33546
See application file for complete search history.

(56) References Cited

U.S. PATENT DOCUMENTS

| | | | |
|---|---|---|---|
| 9,479,047 B2* | 10/2016 | Lim | H02M 3/158 |
| 2001/0033157 A1 | 10/2001 | Wile | |
| 2010/0231138 A1 | 9/2010 | Kumada et al. | |
| 2010/0237802 A1 | 9/2010 | Aso et al. | |
| 2012/0280628 A1 | 11/2012 | Jin | |
| 2013/0187561 A1 | 7/2013 | Franck et al. | |
| 2013/0313982 A1* | 11/2013 | Reed | H05B 33/0818 |
| | | | 315/186 |
| 2014/0191659 A1 | 7/2014 | Wu | |
| 2016/0057825 A1* | 2/2016 | Hu | H05B 33/0815 |
| | | | 315/201 |
| 2016/0149504 A1* | 5/2016 | Quigley | H02M 1/36 |
| | | | 363/21.04 |

FOREIGN PATENT DOCUMENTS

| | | |
|---|---|---|
| CN | 103477712 A | 12/2013 |
| DE | 29517392 U1 | 2/1996 |
| DE | 69716004 T2 | 6/2003 |
| DE | 102008000027 A1 | 7/2009 |
| DE | 102010003266 A1 | 9/2011 |
| DE | 102010041632 A1 | 3/2012 |
| EP | 2079288 A2 | 7/2009 |
| JP | 2008130438 A | 6/2008 |
| JP | 2010080381 A | 4/2010 |
| NO | 2012151170 A1 | 11/2012 |
| WO | 9739606 A1 | 10/1997 |
| WO | 2012155801 A1 | 11/2012 |

OTHER PUBLICATIONS

German Search Report based on Application No. 10 2014 200 865.4(7 Pages) dated Sep. 19, 2014.
Chinese Office Action based on application No. 201480073262.9 (4 pages and 5 pages of English translation) dated Feb. 4, 2017.

* cited by examiner

CIRCUIT ARRANGEMENT FOR OPERATING LIGHT SOURCES

RELATED APPLICATIONS

The present application is a national stage entry according to 35 U.S.C. §371 of PCT application No.: PCT/EP2014/073783 filed on Nov. 5, 2014, which claims priority from German application No.: 10 2014 200 865.4 filed on Jan. 17, 2014, and is incorporated herein by reference in its entirety.

TECHNICAL FIELD

Various embodiments relate to a circuit arrangement for operating light sources, including: input terminals for inputting a power supply system voltage, a first rectifying circuit, a boost converter having output terminals, a half-bridge arrangement including two switches, which is connected to the output terminals, an inductance, the first terminal of which is coupled to the centre point of the half-bridge arrangement, a second rectifying circuit, the first input terminal of which is coupled to the second terminal of the inductance and the second input of which is coupled to at least one of the output terminals.

BACKGROUND

Figure 1:
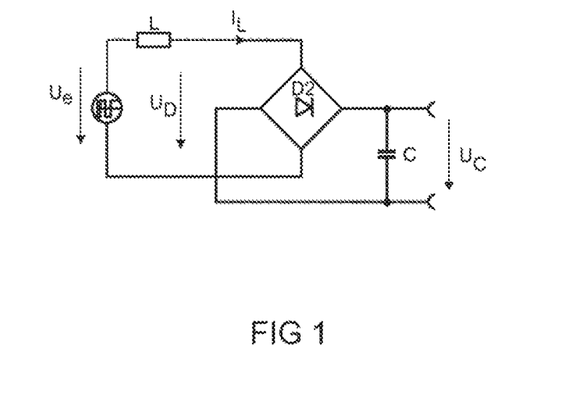
FIG. 1 shows a schematic circuit diagram of a known circuit according to the related art.

FIG. 1 shows a known circuit arrangement having a resonant output characteristic. The inductor L regulates the current from a pulse source $U_e$. The AC current limited by the inductor is rectified by a bridge rectifier and filtered by a capacitor.

In practice, however, with such a circuit arrangement there are problems regarding electromagnetic compatibility. The problem is manifested in customary arrangements of semiconductor light sources such as LEDs as load. The latter are usually arranged on thin printed circuit boards that are in turn implemented on a metallic heat sink for cooling the LEDs. The heat sinks are normally grounded for safety reasons. In this case, parasitic capacitances $C_{Module}$ occur between the LEDs and the grounded heat sink. Said parasitic capacitances may be very high with a value of up to 2 nF. On account of the high parasitic capacitances, the interference potential is correspondingly high as well.

Figure 2:
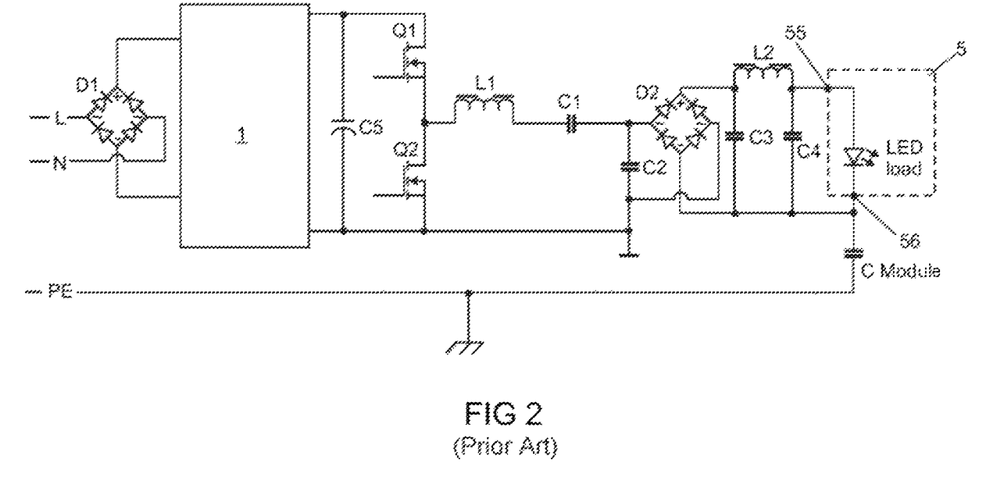
FIG. 2 shows a real circuit diagram of the above circuit with all functionally relevant components.

FIG. 2 shows a real test set-up similar to the circuit described in FIG. 1 on the basis of an operating device for fluorescent lamps that operates resonantly. The power supply system voltage present at the two input terminals is rectified by the first bridge rectifier D1 and converted by a boost converter circuit, which often operates as a power supply system power factor correction circuit, to an intermediate circuit voltage of approximately 400 V at the intermediate circuit capacitor C5. By means of a half-bridge arrangement connected to the output terminals of the boost converter circuit, a rectangular voltage is generated from the boosted DC voltage. The half-bridge arrangement consists of two series-connected transistors Q1 and Q2. The inductor L1 and the blocking capacitor C1 form a resonant circuit. The DC voltage components of the signal are filtered by the blocking capacitor C1. The output current of the resonant circuit is rectified by the second bridge rectifier D2 and smoothed by a Pi filter including C3, L2 and C4. The semiconductor light sources are arranged in parallel with the capacitor C4. The parasitic capacitance $C_{Module}$ is situated between the LED module 5 and the grounding PE of the power supply system. Said parasitic capacitance is depicted for simplification between the cathode of the bottommost semiconductor light source or the negative terminal 56 of the LED module and the grounding PE. In practice it has been found that between the semiconductor light sources and the grounded heat sink high grounding currents of above 100 mA can flow via the parasitic capacitance $C_{Module}$.

Figure 3:
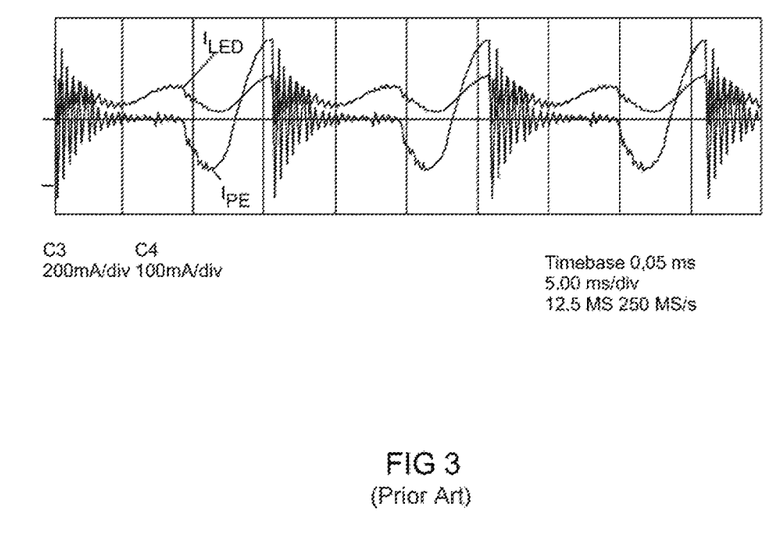
FIG. 3 shows the waveform of the ground current and of the LED current that occurs during operation of the above circuit in accordance with FIG. 2.

FIG. 3 shows this grounding current $I_{PE}$ in an oscillogram. The current $I_{LED}$ is the operating current through the LEDs. These high grounding currents give rise to severe electromagnetic interference. These currents are above the limit values of many correspondingly valid standards for luminaire arrangements in which the operating device for the LEDs and the LED module are spatially separated. As a result of the impermissibly high ground currents and the severe electromagnetic interference, this circuit topology cannot be used for the above-mentioned application.

Figure 4:
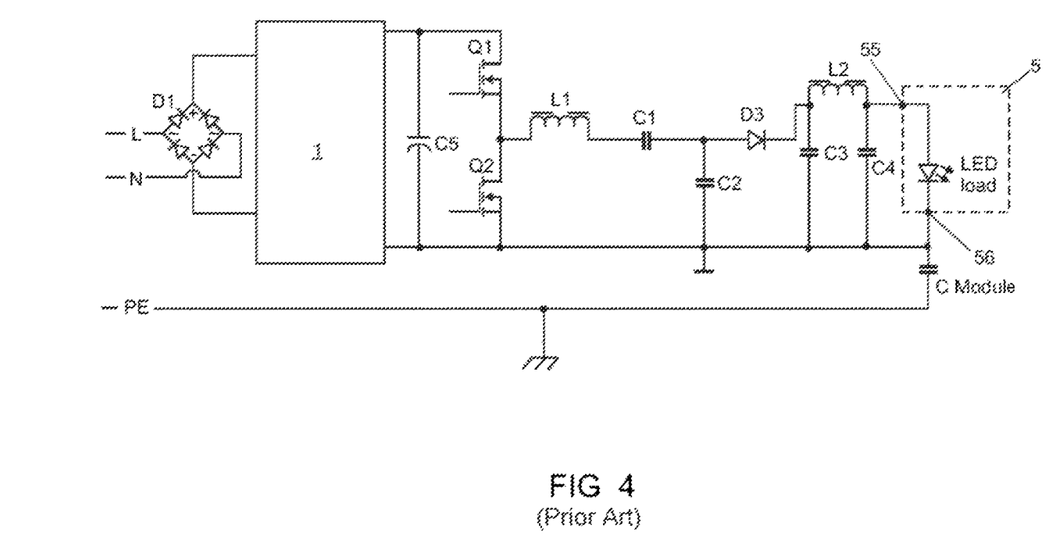
FIG. 4 shows the circuit diagram of an alternative embodiment according to the related art with a half-wave rectification.

A solution with a half-wave rectification that is known in the related art is shown in FIG. 4. A simple diode D3 is used instead of the second bridge rectifier. As a result, the cathode of the bottommost LED, and thus the negative pole 56 of the LED module 5, is always at ground. As a result of this measure, no significant interference current can form via the parasitic capacitance $C_{module}$.

As a result of the half-wave rectification, however, the diode D3 conducts only for one polarity of the resonant circuit including L1 and C2; therefore, a high reactive current in comparison with the LED current is necessary, which leads to higher losses and a low efficiency of the circuit arrangement of only 80% to 85%.

Figure 5:
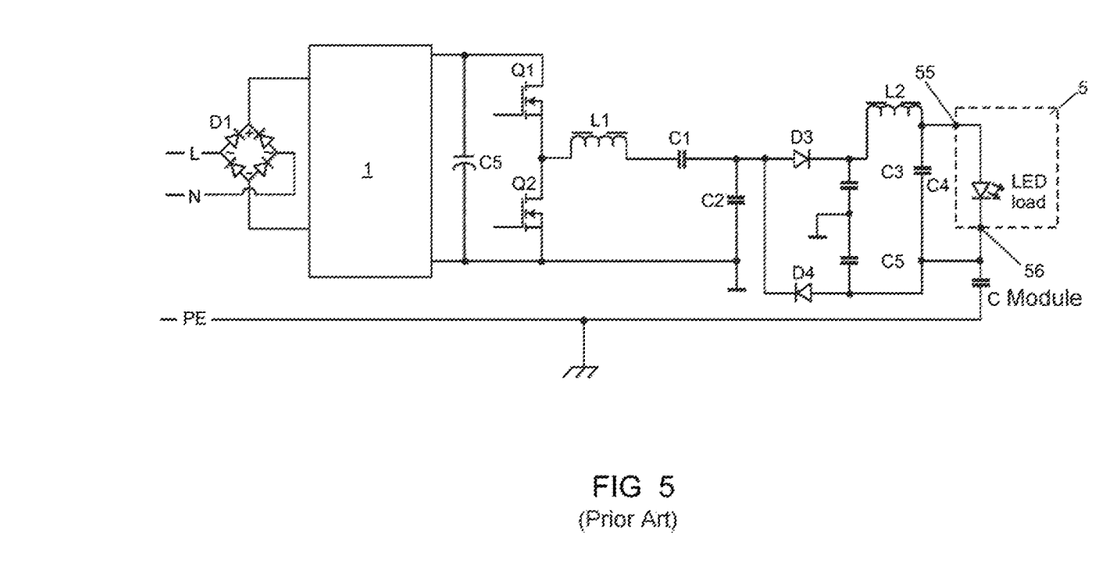
FIG. 5 shows the circuit diagram of another alternative embodiment according to the related art with a voltage doubling circuit.

FIG. 5 shows an alternative with a voltage doubler circuit. This circuit includes two diodes D3 and D4, as a result of which a full-wave characteristic is provided. A current flows through D3 given a positive polarity of the resonance voltage at C2, and through D4 given a negative polarity thereof. The capacitors C3 and C5 provide for a current flow to ground. In comparison with the bridge rectifier in accordance with FIG. 2, however, the high-frequency voltage swing with respect to ground is very small. The advantages and disadvantages of the circuit are similar to the circuit having half-wave rectification in accordance with FIG. 4.

SUMMARY

Various embodiments provide a circuit arrangement for operating light sources, including: input terminals for inputting a power supply system voltage, a first rectifying circuit, a boost converter having output terminals, a half-bridge arrangement including two switches, which is connected to the output terminals of the boost converter, an inductance, the first terminal of which is coupled to the centre point of the half-bridge, a second rectifying circuit, the first input terminal of which is coupled to the second terminal of the inductance and the second input of which is coupled to at least one of the output terminals of the boost converter, wherein the output terminals of the second rectifying circuit are coupled to the inputs of a current-compensated inductor, wherein at least one light source is connected to the output terminals of the current-compensated inductor, and the output terminals of the current-compensated inductor are coupled to an output terminal of the boost converter via filter capacitors. As a result of this measure, the ground currents are reliably prevented since the potential relative to ground is matched by the feedback through the filter capacitors to the boost converter. In this case, the current-compensated inductor prevents a short circuit from the boost converter via the bridge rectifier.

Preferably, a coupling capacitor is connected between the inductance and the second rectifying circuit. Said coupling capacitor prevents a DC component in the rectifier current.

In a further configuration, a respective coupling capacitor is connected between the second input of the second rectifying circuit and a reference and respectively supply potential of the half-bridge arrangement. As a result of this measure, the circuit becomes more symmetrical, which also has an effect on the component loading.

Preferably, the ratio of the capacitances of the filter capacitors is greater than 1:10. Thus, one of the filter capacitors is very small and can interact with the leakage inductance of the current-compensated inductor. The output of the circuit arrangement according to various embodiments thus has a current source characteristic.

However advantageous developments and configurations of the circuit arrangement according to various embodiments for operating light sources are evident from further dependent claims and from the following description.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 6:
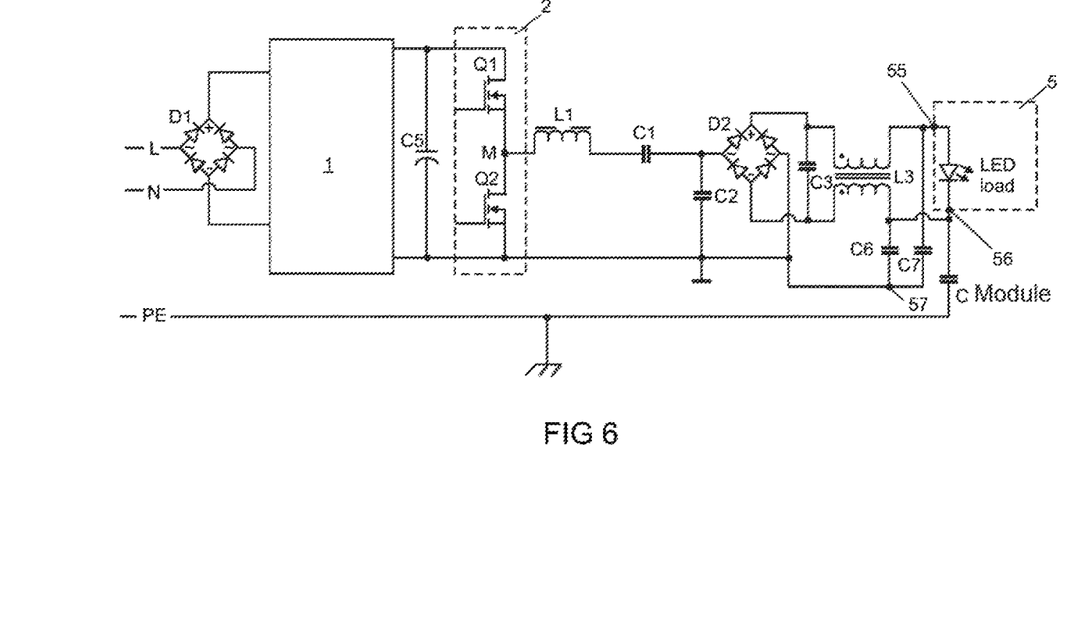
FIG. 6 shows the circuit diagram of a first embodiment according to various embodiments including a current-compensated inductor.

FIG. 6 shows the circuit diagram of a first embodiment according to various embodiments of the circuit arrangement for operating light sources including a current-compensated inductor.

The circuit arrangement according to various embodiments includes two inputs L, N for inputting a power supply system voltage. Said inputs are coupled to a first rectifying circuit, e.g. a bridge rectifier D1, the outputs of which are coupled to the inputs of a boost converter circuit 1. The boost converter circuit 1 is often embodied as a power factor correction circuit in order that the power supply system power factor of the circuit arrangement is kept high. The boost converter circuit operates on a storage capacitor C5, often also referred to as an intermediate circuit capacitor. A half-bridge arrangement 2 is connected in parallel with the intermediate circuit capacitor C5. The half-bridge arrangement 2 consists of two series-connected transistors Q1 and Q2, the half-bridge centre point of which is designated by M. The first terminal of an inductor L1 is coupled to the half-bridge centre point M, the second terminal of said inductor being coupled to the first terminal of a blocking capacitor C1. The second terminal thereof is coupled to a first input of a second rectifying circuit, e.g. of a second bridge rectifier D2, and to the first terminal of a resonance capacitor C2. The blocking capacitor C1 is not absolutely necessary, however, for the correct function of the circuit arrangement. It merely ensures that the current through the inductor L1 has no DC component. The second input of the bridge rectifier D2 is coupled to the reference potential of the half-bridge arrangement. The second terminal of the resonance capacitor C2 is connected to the reference potential of the half-bridge arrangement. The outputs of the second bridge rectifier D2 are coupled to respectively a first terminal of a winding of the current-compensated inductor. A capacitor C3 is connected to the outputs of the second bridge rectifier D2. An LED module 5 including at least one LED is coupled to the respective second terminal of the winding of the current-compensated inductor L3. The second terminal of the winding of the current-compensated inductor L3 that is coupled to the positive output of the bridge rectifier is coupled to a filter capacitor C7 and to the positive input 55 of the LED module 5. The second terminal of the winding of the current-compensated inductor L3 that is coupled to the negative output of the bridge rectifier D2 is coupled to a filter capacitor C6 and to the negative input 56 of the LED module 5. The other terminals of the filter capacitors C6 and C7 form a centre point 57. Said centre point 57 is coupled to the reference potential of the half-bridge arrangement. The parasitic capacitance $C_{Module}$ exists as distributed capacitance between the LED module and ground PE.

The inductor L1 and the resonance capacitor C2 together form a resonant circuit, which imparts a resonant output characteristic to the arrangement. In this case, the output current is set by means of the dimensioning of the inductor L1. As far as the coupling capacitor C1, the circuit corresponds to known circuits for operating devices for low-pressure discharge lamps. This circuit type is used particularly frequently in operating devices for fluorescent lamps. The latter can now be used with the modification according to various embodiments for the operation of LED modules.

According to various embodiments, the filter capacitors C6 and C7 together with the current-compensated inductor L3 damp the grounding current through $C_{Module}$. Since the grounding current flows symmetrically through the current-compensated inductor L3, it is damped. By virtue of the fact that C6 and C7 are directly connected to the ground of the resonant circuit and thus via the first bridge rectifier D1 to the power supply system, they can short-circuit high-frequency interference through $C_{Module}$.

At the same time, the components C3, C6, C7 and L3 filter the high-frequency ripple of the LED current through the LED module 5.

By contrast, the LED current itself is not damped, since it constitutes a differential-mode current having a high DC component for the current-compensated inductor L3.

The filter capacitors C6 and C7 can also be embodied asymmetrically, such that the larger capacitor also damps the high-frequency ripple of the current through the LED module 5, whereas the smaller capacitor only damps the grounding current through $C_{Module}$. In this case, the larger capacitor should have a capacitance of between 20 nF and 200 nF, and the smaller capacitor should have a capacitance of between 1 nF and 10 nF. The difference in the capacitances between C6 and C7 in this embodiment should therefore be at least 1:10. In this case, it is unimportant which of the two capacitors has the larger capacitance and which has the smaller capacitance.

The grounding current through $C_{Module}$ is reduced approximately by the factor 20 with the circuit arrangement according to various embodiments. As a result, the circuit arrangement according to various embodiments emits significantly less electromagnetic interference and the applicable limit values can easily be complied with.

Figure 7:
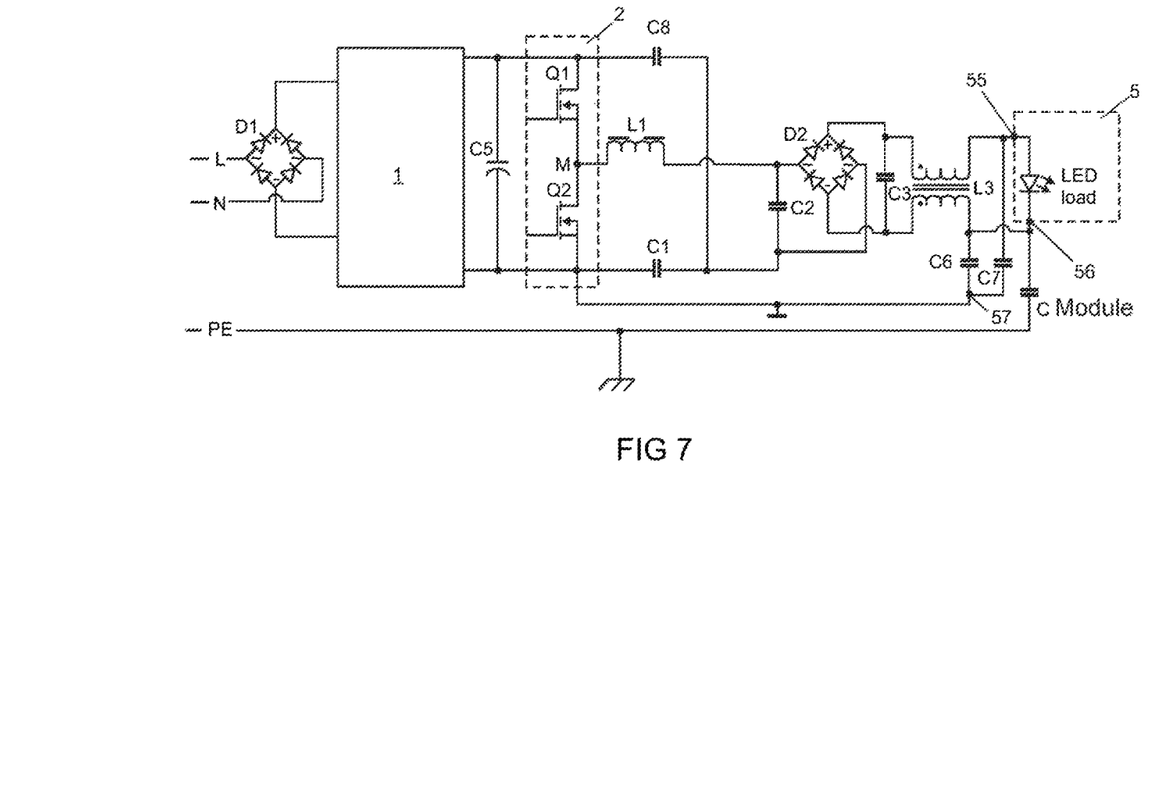
FIG. 7 shows the circuit diagram of a second embodiment according to various embodiments including a current-compensated inductor.

FIG. 7 shows the circuit diagram of a second embodiment according to various embodiments of the circuit arrangement for operating light sources including a current-compensated inductor. The second embodiment is very similar to the first embodiment; therefore, only the differences with respect to the first embodiment will be explained.

The circuit arrangement in accordance with the second embodiment includes its two symmetrically connected coupling capacitors C1, C8 instead of one asymmetrical coupling capacitor C1. The coupling capacitor is therefore removed at the previous location between the inductor L1 and the second bridge rectifier D2. The second terminal of the inductor L1 is directly connected to the first input of the bridge rectifier D2. The second input of the bridge rectifier D2 is coupled to a first coupling capacitor C1 and to a second coupling capacitor C8. The other terminal of the first coupling capacitor C1 is coupled to the reference potential of the half-bridge arrangement 2. The other terminal of the second coupling capacitor C8 is coupled to the supply potential of the half-bridge arrangement 2. A filter capacitor C6 is connected to the output of the winding of the current-compensated inductor L3, the input of which is coupled to the negative output of the second bridge rectifier. A filter capacitor C7 is connected to the output of the winding of the current-compensated inductor L3, the input of which is coupled to the positive output of the second bridge rectifier. The other terminals of the filter capacitors C6 and C7 are interconnected and connected to the reference potential of the half-bridge arrangement 2. They are thus likewise coupled to C1. As a result of the symmetrical embodiment of the coupling capacitors C1 and C8, the loading of some components such as e.g. the capacitor C5 is lower.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A circuit arrangement for operating light sources, comprising:
   input terminals for inputting a power supply system voltage,
   a first rectifying circuit,
   a boost converter having output terminals,
   a half-bridge arrangement comprising two switches, which is connected to the output terminals of the boost converter,
   an inductance, the first terminal of which is coupled to the centre point of the half-bridge, and
   a second rectifying circuit, the first input terminal of which is coupled to the second terminal of the inductance and the second input of which is coupled to at least one of the output terminals of the boost converter, wherein
   the output terminals of the second rectifying circuit are coupled to the inputs of a current-compensated inductor, wherein at least one light source is connected to the output terminals of the current-compensated inductor, and the output terminals of the current-compensated inductor are coupled to an output terminal of the boost converter via filter capacitors.

2. The circuit arrangement as claimed in claim 1, wherein a coupling capacitor is connected between the inductance and the second rectifying circuit.

3. The circuit arrangement as claimed in claim 1, wherein a respective coupling capacitor is connected between the second input of the second rectifying circuit and a reference and respectively supply potential of the half-bridge arrangement.

4. The circuit arrangement as claimed in claim 1, wherein the ratio of the capacitances of the filter capacitors is greater than 1:10.

* * * * *